(No Model.)

R. W. BAYLEY.
AIR BRAKE APPARATUS FOR CARS.

No. 429,332. Patented June 3, 1890.

WITNESSES:
R H Whittlesey
E. Newell

INVENTOR,
R. W. Bayley,
by J Snowden Bell,
Att'y.

UNITED STATES PATENT OFFICE.

RICHARD W. BAYLEY, OF PITTSBURG, PENNSYLVANIA, ASSIGNOR TO THE WESTINGHOUSE AIR BRAKE COMPANY, OF SAME PLACE.

AIR-BRAKE APPARATUS FOR CARS.

SPECIFICATION forming part of Letters Patent No. 429,332, dated June 3, 1890.

Application filed September 30, 1889. Serial No. 325,505. (No model.)

*To all whom it may concern:*

Be it known that I, RICHARD W. BAYLEY, a citizen of the United States, residing at Pittsburg, in the county of Allegheny and State of Pennsylvania, have invented or discovered a certain new and useful Improvement in Air-Brake Apparatus for Cars, of which improvement the following is a specification.

The object of my invention is to provide an air-brake apparatus adapted for application to drop-bottom or other cars of such special form as to prevent or interfere with the employment of the standard or ordinary air-brake constructions; to which end my invention, generally stated, consists in the combination of a brake-cylinder adapted to be located transversely to a car and above the bottom thereof and a bell-crank lever having an upper arm above the bottom of the car coupled to the piston-rod of said cylinder and a lower arm coupled to a pull-rod connected with brake-levers The improvement claimed is hereinafter fully set forth.

Figure 1:
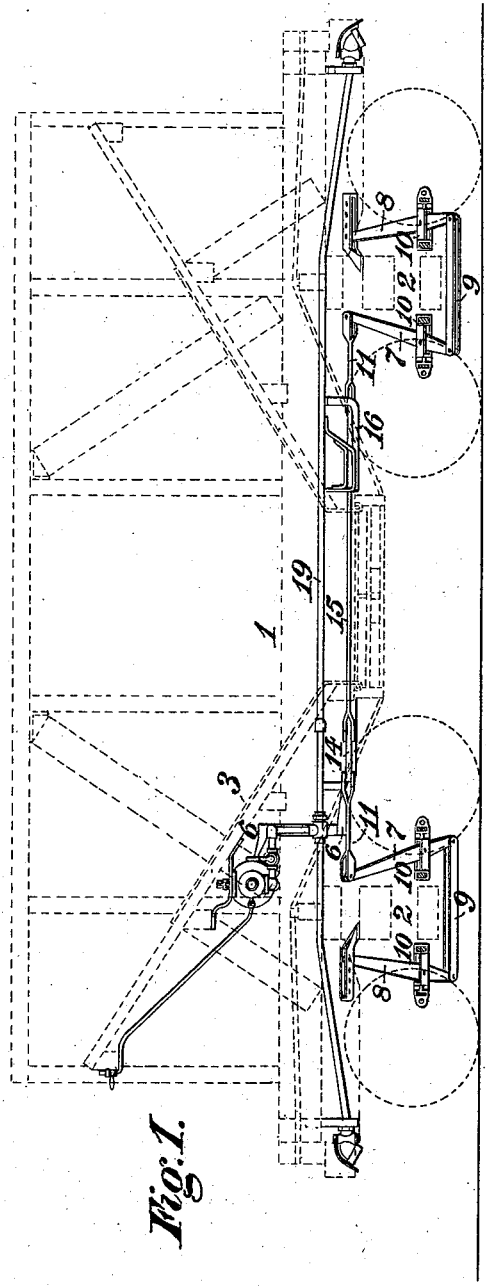
Figure 2:
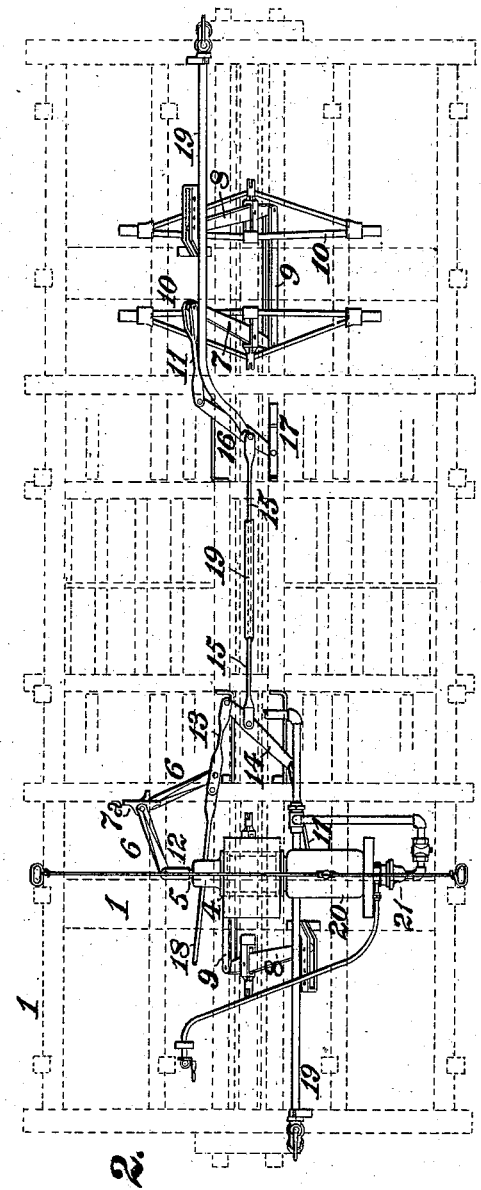

In the accompanying drawings, Figure 1 is a side view in elevation, illustrating my invention as applied to a drop-bottom gondola car; and Fig. 2, a plan or top view of the same.

In the practice of my invention I secure upon the frame 1 of the car above its sills a brake-cylinder 4, which is located transversely to the car and adjacent to one of the inclined ends of its hopper bottom or bottoms 3, above the drop-bottom or door thereof, so as to stand entirely clear of the truck. The brake-cylinder is fitted with the usual piston, the rod 5 of which is connected at its outer end with one arm of a bell-crank lever 6, journaled in bearings 7ᵃ on the frame. The other arm of the bell-crank lever 6, which is located below the car-frame, is connected through the intermediation of links, as presently to be described, with pull-rods 11, each of which is coupled to a brake-lever 7 of one of the trucks 2 of the car. The brake-levers 7 and 8 of each truck are coupled one to the other by connecting bars or links 9, and each brake-lever is also coupled to a brake-beam 10, carrying the usual brake heads and shoes for applying pressure to the wheels.

The lower arm of the bell-crank lever 6 is coupled by a link 13 to a lever 14, the opposite end of which is coupled to the pull-rod 11 of the adjacent truck 2. The lever 14 is connected by a rod or bar 15 with a lever 16, which is hung at one end in a bearing 17 on the frame adjacent to the other truck of the car, and is coupled at its opposite end to the pull-rod 11 of said truck. The link 13 is connected by a rod 18 with a chain of the hand-brake shaft. Air under pressure is supplied to the brake-cylinder from a main air or brake pipe 19, in this instance through the intermediation of a triple valve 21 and auxiliary reservoir 20, as in standard automatic air-brake practice, and it will be seen that by the outward movement of the piston-rod of the brake-cylinder, effected by the exertion of pressure therein upon a reduction of pressure in the brake-pipe, the bell-crank lever 6 is swung in its bearing, and through its connections with the pull-rods 11 the requisite draft is exerted thereon for setting or applying the brakes on both trucks.

I claim as my invention and desire to secure by Letters Patent—

In a brake apparatus, the combination of a brake-cylinder located above and transversely to a car-frame, a bell-crank lever having an arm above the car-frame coupled to the piston-rod of said cylinder, two brake-applying levers carrying brake beams and shoes in separate trucks, a pull-rod coupled to each of said brake-applying levers, two levers, each coupled to one of said pull-rods, a rod or bar connecting said last-specified levers, and a link coupling the lower arm of the bell-crank to one of said last-specified levers, substantially as set forth.

In testimony whereof I have hereunto set my hand.

RICHARD W. BAYLEY.

Witnesses:
 HENRY J. WEBSTER,
 M. K. GARRETT.